United States Patent
Feuillard et al.

(10) Patent No.: US 7,469,529 B2
(45) Date of Patent: Dec. 30, 2008

(54) CHEVRON-TYPE PRIMARY EXHAUST NOZZLE FOR AIRCRAFT TURBOFAN ENGINE, AND AIRCRAFT COMPRISING SUCH A NOZZLE

(75) Inventors: Philippe Feuillard, Gardouch (FR); Philippe Hemeury, Blagnac (FR); Christian Gerri, Fonsorbes (FR)

(73) Assignee: Airbus France, Toulouse (FR)

( * ) Notice: Subject to any disclaimer, the term of this patent is extended or adjusted under 35 U.S.C. 154(b) by 592 days.

(21) Appl. No.: 11/088,710

(22) Filed: Mar. 24, 2005

(65) Prior Publication Data

US 2006/0053769 A1    Mar. 16, 2006

(30) Foreign Application Priority Data

Mar. 25, 2004    (FR) ................................. 04 50586

(51) Int. Cl.
 *F02K 3/02*    (2006.01)
(52) U.S. Cl. ................... 60/226.1; 239/265.19
(58) Field of Classification Search ............. 60/226.1, 60/262, 770; 239/265.19, 265.33, 265.39
 See application file for complete search history.

(56) References Cited

U.S. PATENT DOCUMENTS

| | | | | |
|---|---|---|---|---|
| 2,806,349 | A * | 9/1957 | Yeager | 239/127.1 |
| 3,041,822 | A * | 7/1962 | Embree | 60/242 |
| 4,043,508 | A * | 8/1977 | Speir et al. | 239/265.19 |
| 4,050,242 | A * | 9/1977 | Dusa | 60/204 |
| 4,064,692 | A * | 12/1977 | Johnson et al. | 60/762 |
| 4,080,785 | A * | 3/1978 | Koff et al. | 60/226.3 |
| 4,294,068 | A * | 10/1981 | Klees | 60/204 |
| 6,360,528 | B1 * | 3/2002 | Brausch et al. | 60/262 |
| 6,813,877 | B2 * | 11/2004 | Birch et al. | 60/226.1 |
| 7,093,423 | B2 * | 8/2006 | Gowda et al. | 60/204 |
| 7,246,481 | B2 * | 7/2007 | Gutmark et al. | 60/204 |
| 2001/0035004 | A1 | 11/2001 | Balzer | |
| 2002/0121090 | A1 * | 9/2002 | Zysman et al. | 60/770 |
| 2002/0178711 | A1 * | 12/2002 | Martens | 60/226.1 |

\* cited by examiner

*Primary Examiner*—William H Rodriguez
(74) *Attorney, Agent, or Firm*—Patterson, Thuente, Skaar & Christensen, P.A.

(57) ABSTRACT

A primary exhaust nozzle for a turbofan engine of the double, separated air-flow type for aircraft comprises: an inner coat, within which there circulates a primary air flow (FP), comprising chevrons at an external end and an outer coat at least partially surrounding the inner coat and along which there flows a secondary air flow (FS), the outer coat being mobile along the inner coat. Also disclosed is an aircraft comprising such an exhaust nozzle.

8 Claims, 2 Drawing Sheets

-A:

-B:

-C:

-D:

US 7,469,529 B2

CHEVRON-TYPE PRIMARY EXHAUST NOZZLE FOR AIRCRAFT TURBOFAN ENGINE, AND AIRCRAFT COMPRISING SUCH A NOZZLE

RELATED APPLICATION

The present application claims priority to French Application No. 04 50586 filed Mar. 25, 2004.

FIELD OF THE INVENTION

The invention relates to a chevron-type primary exhaust nozzle for an aircraft turbofan engine. The nozzle of the invention, which is of the double-coat or double-wall type, has a system of reversible chevrons designed to attenuate the noise during the aircraft takeoff stage.

The invention can be applied in aeronautics and, especially, in the field of the reduction of external sonic nuisance produced by the turbo-jet engine of an aircraft, especially during take-off.

BACKGROUND OF THE INVENTION

In aeronautics, it is known that the noise produced by an aircraft, such as an airplane, is particularly unpleasant and unbearable for people in the region of an airport, i.e. those living in dwellings close to an airport. This noise is particularly intense during the take-off phases of aircraft. Hence, for many years, aircraft manufacturers been trying to attenuate the noise produced by aircraft to the utmost, especially during take-off.

As a rule, the noise caused by an aircraft turbofan engine, especially under full power, is generated by the speed of ejection of burnt gases at the exhaust outlet. From an installation viewpoint, the turbofan engine is housed in a nacelle equipped in its rear part with primary and secondary exhaust systems. The primary conduit, corresponding to the primary exhaust system, has a primary nozzle whose purpose is to convey a stream of hot air into the open at constant energy of speed. The secondary conduit, corresponding to the secondary exhaust system, is defined by the volume between the external part of the primary nozzle and the internal part of the thrust inverter. Air exhaust systems, on the whole, have the function of converting the pressure energy of the gases into energy of speed and hence into thrust. The speed of air at the outlet from the primary nozzle prompts a jet noise. The higher the engine speed, the greater is this jet noise. Since an aircraft has its maximum thrust at take-off, it will be understood that the jet noise caused by its engines is the maximum at take-off. Once the aircraft has reached its cruising phase, the noise caused by the engines is often less important, because of the distance of the aircraft from dwellings, and especially because of its high altitude.

At present, to attenuate the jet noise from the turbofan engines of an aircraft during take-off, there is a prior art method of mounting primary exhaust nozzles with fixed chevrons to the aircraft. A chevron exhaust nozzle is a nozzle whose external end, i.e. the end that forms the trailing edge of the nozzle, has a non-smooth shape forming "zigzags". These zigzags may be constituted by a succession of Vs. A chevron exhaust nozzle may be a double-coated nozzle, i.e. a nozzle with an inner coat through which there passes the flow of hot air (the primary flow) and an outer coat in contact with a flow of cold air (secondary flow). A chevron nozzle of this kind has the effect of more efficiently homogenizing the primary and secondary flows and reducing the sonic nuisance caused by the air at high speed in the primary flow.

However, a chevron nozzle has a negative influence on the performance of the engine. Indeed, acoustic optimization lowers the efficiency of the nozzle in terms of pure performance. For equal thrust, a turbofan engine with chevron exhaust nozzles consumes a substantially greater quantity of fuel than a turbofan with smooth nozzles. Indeed, turbulence is then generated, thus inducing load losses and, therefore, greater fuel consumption. In small-sized aircraft that make short flights, the effect of the increase in this specific consumption is small (it is about 0.1%) since the cruising phase is short. However, in large aircraft making long-haul flights, fuel consumption, which is basically substantially greater than in a more modestly sized aircraft, rises significantly. Indeed, it will be understood that the greater the duration of the flight, the more appreciable will be the increase in consumption, and this has a well-known economic effect.

Furthermore, at low speed, the presence of chevron exhaust nozzles increases the thrust of the aircraft whereas, at high speed, the thrust, for a given motor speed, is affected negatively. Hence, to avoid modifying the performance of the aircraft, it is possible to set up an automatic control link between an adjustment of thrust and the speed of the aircraft. The defining of such an adjustment is complex and can prove to be costly. Furthermore, a surveillance system has to be implemented to ensure the efficient configuration of the nozzle.

EXPLANATION OF THE INVENTION

The invention is aimed precisely at overcoming the drawbacks of the techniques explained hereinabove, in taking account of the fact that the effect of the chevrons on the performance of the turbofan engine is notable throughout the flight and that the acoustic utility of these chevrons appears near the ground. To this end, the invention proposes a double-coated type of nozzle having one of its coats equipped with chevrons made reversible by the overlapping of the other coat. For this purpose, the outer coat of the nozzle is mobile along the inner coat, offering the nozzle a chevron configuration and a smooth-coated configuration. Thus, the invention proposes to use the advantages of a chevron nozzle when the aircraft is at low altitude at high engine speed and the advantages of a smooth-coated nozzle, i.e. a nozzle without chevrons, for all the other phases of flight. In this way, the external noise is reduced during the aircraft take-off phase but there is no impact on the performance of the aircraft during the rest of the flight.

More specifically, the invention relates to a primary exhaust nozzle for a turbofan engine of the double, separated air-flow type for aircraft comprising:
- an inner coat, within which there circulates a primary air flow, comprising chevrons at an external end,
- an outer coat at least partially surrounding the inner coat and along which there flows a secondary air flow.

This nozzle is characterized by the fact that the outer coat is mobile along the inner coat.

In a preferred embodiment of the invention, the nozzle has a sliding device between the inner coat and the outer coat.

The invention may also have one or more of the following characteristics:
- the sliding device is driven by at least one thruster,
- the sliding device has guide rails,
- the sliding device has guide rollers,
- the thruster is controlled by air flow.
- the chevrons of the inner coat have a zigzag shape, the zigzags are constituted by a succession of trapezoidal or U-shaped cuts.

The invention also relates to an aircraft comprising a turbofan engine wherein said turbofan engine has an exhaust nozzle as described here above.

DETAILED DESCRIPTION OF THE EMBODIMENT OF THE INVENTION

Figure 1:
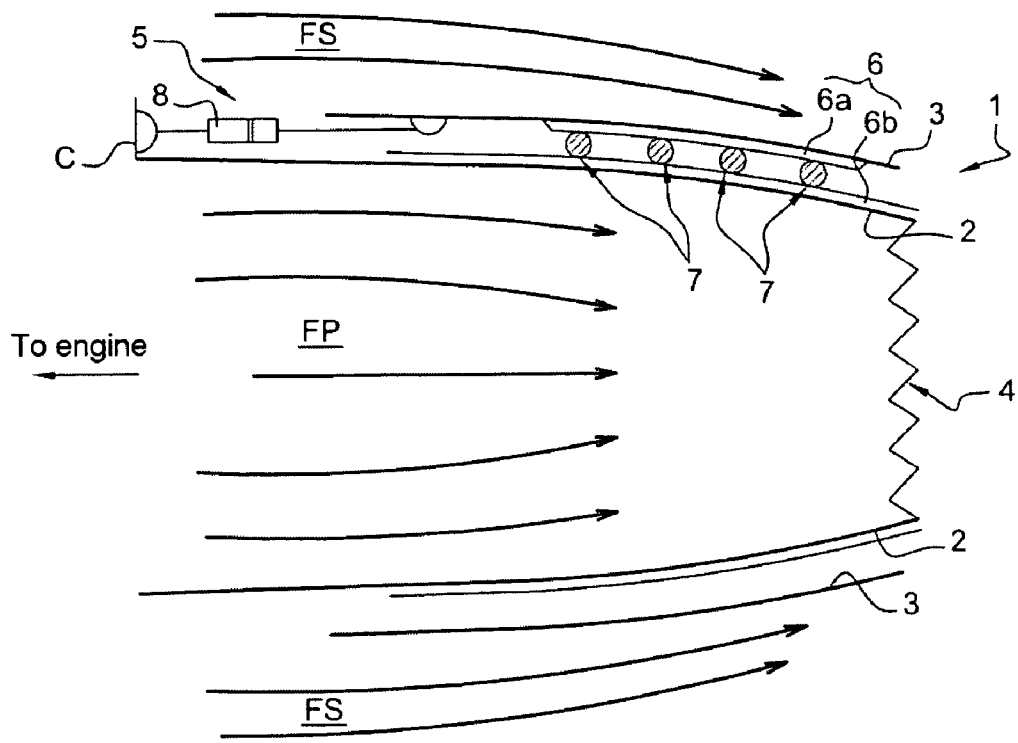
FIG. 1 is a schematic view in section of an exhaust nozzle according to the invention, in its configuration with chevrons.

An example of a chevron exhaust nozzle according to the invention is shown in FIG. 1. This exhaust nozzle 1 has an inner coat 2 and an outer coat 3. The inner coat 2 is in contact with the flow of hot air coming from the turbofan engine, called a primary flow FP. The outer coat 3, which at least partly surrounds the inner coat 2, is in contact with the flow of ambient cold air, called a secondary flow FS. The inner coat 2 and the outer coat 3 are concentric with each other. This double-coat exhaust nozzle is made out of two different materials. The inner coat 2 is made out of a material with high mechanical characteristics at high temperatures, for example a material such as Inconel. These materials with high thermal characteristics generally have the drawback of being heavy. The outer coat 3, located on the cold side of the exhaust nozzle, is made out of a material with high mechanical resistance in order to withstand the forces to which the exhaust nozzle is subjected. The material of the outer coat is chosen to be as light as possible so as to optimize the mass breakdown of the entire unit. This material may be titanium. One of the advantages of a double-coat exhaust nozzle is that it enables the aerodynamic optimization of the hot and cold flows.

As can be seen in the FIG. 1, the nozzle 1 of the invention has chevrons 4. These chevrons are inserted at the external end of the inner coat 2, i.e. at the edge of the exhaust nozzle located at the rear end of the turbo-jet engine. The chevrons of the inner coat have a shape that is optimized as a function of the cycle of the turbofan engine and the attenuation levels sought. In other words, the external edge of the inner coat 2 comprises, for example, chevrons 4 forming a zigzag surface.

Figure 3:
FIG. 3 shows different patterns of chevrons that can be made on the exhaust nozzle of the invention.
Figure 3:
Figure 3:
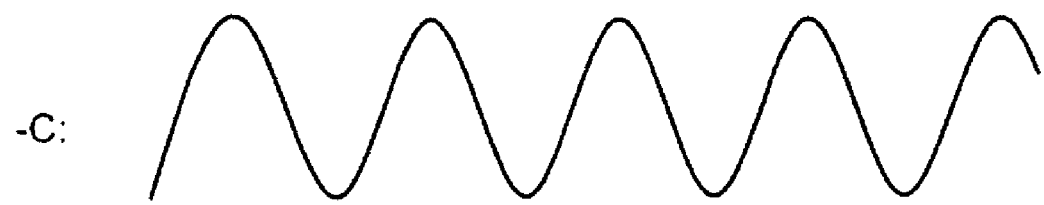
Figure 3:
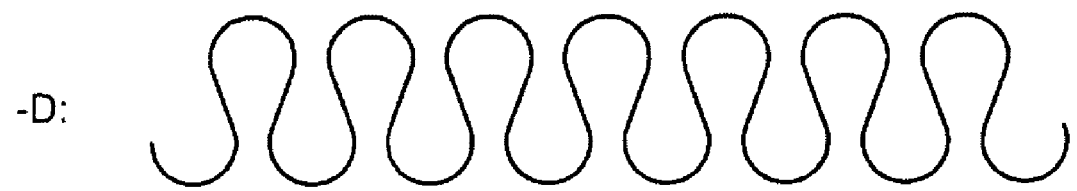

According to the invention, these zigzags may be constituted by a succession of trapezes, for example Vs, as in the example of FIG. 1. These zigzags may have shapes other than that of FIG. 1. Examples of different shapes of chevrons are shown in FIG. 3. The example A of FIG. 3 shows V-shaped zigzags, as explained here above. The example B of FIG. 3 shows zigzags constituted by a succession of Vs of different sizes, forming a saw-toothed pattern. The example C of the FIG. 3 shows zigzags formed by a succession of Us. The example D of FIG. 3 shows zigzags shaped like flower petals. Other shapes of chevrons may also be used in the exhaust nozzle of the invention, the shape chosen for the chevrons depending on the type of engine considered and the results of wind tunnel studies and tests.

The number of chevrons in the invention may also be optimized according to the cycle of the turbofan engine and the levels of attenuation being sought.

In the example of FIG. 1, the outer coat 3 is installed around the inner coat 2 so as to be mobile along said inner coat 2. This mobility is obtained by a sliding device 5. According to one embodiment of the invention, this sliding device 5 comprises guiding means 6, 7 and at least one actuating thruster 8. The guiding means have guide rails 6. These guide rails may be simple, i.e. they may slide in each other. One of the rails 6b is fixed to the outer wall of the inner coat 2 and the other rail 6a is fixed to the inner wall of the outer coat 3. In the example of the FIG. 1, the guiding means also have rollers 7 mounted between the rails 6a and 6b. These rollers provide for improved sliding of the outer coat along the inner coat, by rolling of the rollers 7 between the rails 6a and 6b. In the invention, the size of the rollers may condition the distance between the inner coat and the outer coat, thus constituting an optimizing parameter.

It must be noted that, during flight, the chevrons are subjected to stresses in motion either by the vibrations of the turbofan engine or by effects known as flutter effects. The stresses are a source of fatigue because they give rise to significant strains in the hollow of the chevrons. The outer coat 3, in sliding on the chevrons 4, prevents these unwanted movements.

FIG. 1 shows a single set of rails and rollers, given that several of these sets may be distributed on the circumference of the exhaust nozzle.

The sliding of the outer coat 3 is actuated by at least one thruster 8 placed upstream from the exhaust nozzle. This thruster is fixed firstly to the outer coat 3 and, secondly, to the housing C of the turbofan engine. This thruster may be controlled by known control techniques, for example electrically or hydraulically. In a preferred embodiment, it is controlled by air flows: the air can be tapped at a high-pressure compressor of the engine.

In the example of FIG. 1, only one thruster 8 is shown. It is understood that several thrusters of this type may be distributed on the rim of the exhaust nozzle, for example two of them placed symmetrically with each other.

FIG. 1 shows the exhaust nozzle of the invention in its chevron configuration. In other words, the exhaust nozzle is shown in the aircraft take-off position. In this position, the outer coat is made to slide forward, i.e. toward the inlet of the engine. The chevrons are prominent relative to the outer coat. They can then play their role of acoustic attenuator to the fullest extent.

The sliding device 5 also enables the translation of the outer coat 3 in parallel to the inner coat 2 toward the outlet of the engine, i.e. toward the rear of the aircraft so as to conceal the chevrons 4. The rear end of the outer coat 3 (i.e. the end pointed toward the rear of the aircraft) is then aligned with the rear part of the chevrons installed on the inner coat 2. The exhaust nozzle is then in a smooth-coat configuration. This configuration is shown in FIG. 2.

In this configuration, the airflow coming out of the primary exhaust nozzle only very marginally undergoes the effects of the chevrons in the primary flow. Furthermore, the secondary flow, in this configuration, undergoes no aerodynamic effect. It is therefore worthwhile for the secondary flow to be subjected to a smooth-coat configuration.

Figure 2:
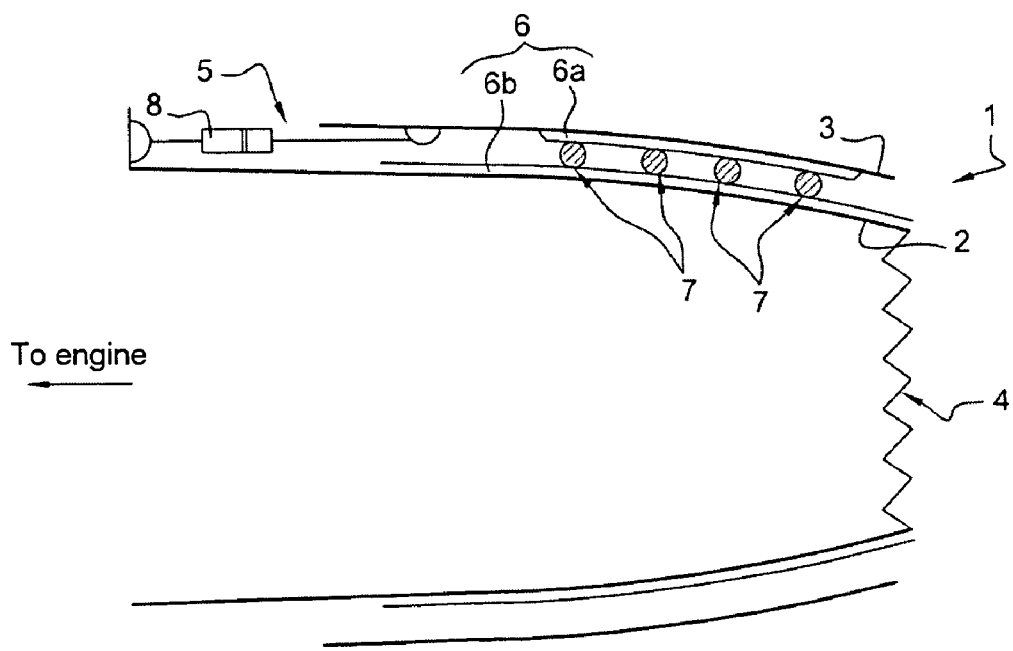
FIG. 2 is a schematic view in section of a nozzle according to the invention in its smooth-coated configuration.

The configuration shown in FIG. 2 is therefore the configuration adopted by the aircraft after take-off, hence for all the other phases of flight.

It will be understood, from the above description, that the sliding of the outer coat relative to the inner coat is done twice during a flight:

the first sliding is done before the take-off by the aircraft, and the second sliding takes place in flight, when the sonic nuisance is no longer a major parameter.

Thus, the first sliding operation (in the chevron configuration) takes place before take-off, when the turbofan engine is put into take-off thrust. This function may be automatically controlled in a link with the position of the throttle levers as well as in relation to the engine speed.

The second sliding operation places the exhaust nozzle in the smooth-coat configuration. This configuration is set up when the aircraft is at a sufficient distance from the noise-sensitive areas. This distance corresponds to a certain altitude. The criterion for the passage into the smooth-coat configuration may therefore be the altitude reached by the aircraft. It may also be the thrust achieved by the aircraft. This thruster may be detected according to a position of the flight control lever or else as a function of the parameter N1, which is one of the parameters giving the thrust FN of the aircraft. The automatic control link enabling the passage into this configuration may be defined as a function of only one criterion or several of these criteria (such as control lever position, level of N1, altitude). Other parameters may be used, especially to take cases of malfunctioning into account.

In one variant of the invention, a position of security (with a smooth-coat configuration) may be defined without affecting the performance of the aircraft. Similarly, a system for monitoring the position of the exhaust nozzle can be easily integrated (by position sensors for example).

In addition to the advantages referred to here above, the exhaust nozzle of the invention has that of being adaptable to existing engines, including engines already provided with exhaust nozzles having fixed chevrons. The shape of the chevrons is then chosen as a function of the engine.

What is claimed is:

1. A primary exhaust nozzle for a turbofan engine of the double, separated air-flow type for aircraft comprising:
    an inner coat, wherein a primary air flow circulates within an inner cavity defined by the inner coat, the inner coat comprising chevrons at an external end;
    an outer coat at least partially surrounding the inner coat, wherein a secondary air flow flows along the outer coat; and
    a sliding device positioned between the inner coat and the outer coat, the sliding device having guide rollers,
    wherein the outer coat is shiftable along the inner coat.

2. The exhaust nozzle for turbofan engine according to claim 1, wherein the sliding device is driven by at least one actuator.

3. The exhaust nozzle for turbofan engine according to claim 2, wherein the actuator is controlled by air flow.

4. The exhaust nozzle for turbofan engine according to claim 1, wherein the sliding device has guide rails.

5. The exhaust nozzle for turbofan engine according to claim 1, wherein the chevrons of the inner coat define a zigzag shape.

6. The exhaust nozzle for turbofan engine according to claim 5, wherein the zigzag shape comprises a succession of V's.

7. The exhaust nozzle for turbofan engine according to claim 5, wherein the zigzag shape comprises a succession of U's.

8. An aircraft comprising a turbofan engine with double separated air-flow, wherein said turbofan engine has an exhaust nozzle according to claim 1.

\* \* \* \* \*